United States Patent [19]

Tomibe et al.

[11] Patent Number: 4,690,854

[45] Date of Patent: Sep. 1, 1987

[54] ELECTRICALLY CONDUCTING MATERIAL AND METHOD OF PREPARING SAME

[75] Inventors: Shinji Tomibe, Kyoto; Reizo Gomibuchi, Uji; Kiyofumi Takahashi, Yahata; Noboru Kato, Joyo, all of Japan

[73] Assignee: Nihon Sanmo Dyeing Co., Ltd., Japan

[21] Appl. No.: 777,270

[22] Filed: Sep. 18, 1985

[51] Int. Cl.[4] ......................... B05D 3/10; B05D 5/12; B32B 15/08; C08J 7/00

[52] U.S. Cl. .................................... 428/195; 427/400; 427/412.1; 427/412.2; 427/412.4; 427/419.7; 427/430.1; 427/439; 428/209; 428/379; 428/459; 428/463

[58] Field of Search ............... 428/379, 209, 195, 459, 428/463, 372; 252/512; 427/400, 430.1, 439, 412.1, 412.2, 412.4, 412.5, 419.7

[56] References Cited

U.S. PATENT DOCUMENTS

| | | | |
|---|---|---|---|
| 3,940,533 | 2/1976 | Arsac | 428/225 |
| 3,958,066 | 5/1976 | Ionamura et al. | 428/372 |
| 4,378,226 | 3/1983 | Tomibe et al. | 8/491 |
| 4,557,762 | 12/1965 | Nakaso et al. | 106/1.23 |

FOREIGN PATENT DOCUMENTS

| | | | |
|---|---|---|---|
| 6017080 | 1/1985 | Japan | 106/1.13 |

OTHER PUBLICATIONS

Schmidlin, "Preparation and Dyeing of Fibers", Chapman and Hall Ltd., London, p. 294 (1963).

*Primary Examiner*—Allan M. Lieberman
*Attorney, Agent, or Firm*—Pahl, Lorusso & Loud

[57] ABSTRACT

An electrically conducting material including a polymeric substrate containing mercapto, thiocarbonyl, quaternary ammonium salt, amino or isocyanato groups, and copper sulfide bound to the polymeric substrate. The electrically conducting material may be prepared by treating the polymeric substrate with a source of monovalent copper ions and a sulfur-containing compound to form copper sulfide bound to the polymeric substrate.

15 Claims, No Drawings

ELECTRICALLY CONDUCTING MATERIAL AND METHOD OF PREPARING SAME

This invention relates generally to electrically conducting materials and, more specifically, to copper sulfide-carrying, electrically conducting materials. This invention is also directed to a process for the preparation of such electrically conducting materials.

Numerous methods for imparting electrical conductivity to polymeric materials in the form of shaped bodies are known in the art. For example, in U.S. Pat. No. 3,940,533 issued to Arsac, there is proposed one method for imparting electrical conductivity to synthetic polymeric shaped materials such as polyamide fibers, in which the fibers are first contacted with hydrogen sulfide and the resulting fibers impregnated with the hydrogen sulfide are then immersed in a metal salt solution such as an aqueous copper sulfate solution, to form a deposit of metal sulfide, such as copper sulfide, on the fibers. The copper sulfide deposit on the fibers obtained according to this process is poor in stability, especially in washability, so that the electrical conductivity gradually decreases during use. Further, this process is applicable only to limited kinds of synthetic polymers.

U.S. Pat. No. 4,378,226 owned by Nihon Sanmo Dyeing Co., Ltd. discloses electrically conducting fibers which include fibers having introduced cyano groups, and copper sulfide bound to the fibers. Although the electrically conducting fibers have a high electrical conductivity and exhibit improved washability, they are found to suffer from a drawback because the thickness of the fibers increases and the physical properties of the fibers are changed as a result of the introduction of cyano groups by graft polymerization which proceeds not only on the surface of the fibers but also within them.

The present invention has been made from a consideration of the above problems in the prior art. In accordance with the present invention there is provided an electrically conducting material which comprises a polymeric substrate containing a group selected from mercapto, thiocarbonyl, quaternary ammonium salt, amino and isocyanato, and copper sulfide bound to the polymeric substrate.

In another aspect, the present invention provides a process for the preparation of the above electrically conducting material. The process includes treating the above-described polymeric substrate with a source of monovalent copper ions and a sulfur-containing compound to form copper sulfide bound to the polymeric substrate.

The present invention will now be described in detail below.

Any polymeric material may be used as the substrate provided that it is a water-insoluble solid and it has mercapto radicals, thiocarbonyl radicals, quaternary ammonium salt radicals, amino radicals or isocyanato radicals. The substrate may be in the form of a shaped body such as fiber, film, block, plate or granule or in the form of powder. The polymeric substrate may be produced by a wide variety of methods. Suitable examples of the methods of the production of the polymeric substrate include as follows:

(1) The mercapto group-containing polymeric substrate may be obtained, for example, by hydrogenating a sulfonyl group-containing vinyl chloride resin to convert the sulfonyl groups into mercapto groups. The vinyl chloride resins are homopolymers or copolymers of vinyl chloride and include, for example, polyvinyl chlorides, vinyl chloride/vinyl acetate copolymers, vinyl chloride/vinylidene chloride copolymers, vinyl chloride/maleic acid copolymers, vinyl chloride/ethylene copolymers, vinyl chloride/acrylic acid copolymers and vinyl chloride/acrylate copolymers. The introduction of sulfonyl group into the vinyl chloride resin may be effected by reaction of the vinyl chloride resin with chlorosulfuric acid at an elevated temperature.

The mercapto group-containing polymeric substrate may also be obtained by reaction of hydroxyl group- or amino group-containing polymeric materials with a compound having both of a mercapto group and a group capable of reacting with the hydroxyl or amino group thereof for bonding. Examples of suitable hydroxyl or amino group-containing polymeric materials include various cellulose materials, polyvinyl alcohol resins, polychlals, polyamides and proteins. Examples of suitable compounds to be reacted with these polymeric materials are thioglycolic acid, thiolactic acid, thiosalicylic acid, thiomalic acid, dimercaptoadipic acid, bromopropanethiol, bromothiophenol, iodothiophenol, mercapto acetaldehyde, mercaptopropionaldehyde, methoxyethanethiol, hydroxypropanethiol, 1-mercapto-2-propanone and mercapto group-containing silane coupling agents. Above all, the silane coupling agents may be most suitably used since only a small amount, generally 0.5 to 1 % by weight of the polymeric material, of the silane coupling agent can bind or adsorb a sufficient amount of copper sulfide. Various mercapto group-containing silane coupling agents may be used for the introduction into the polymeric material. Silane compounds having the following general formula:

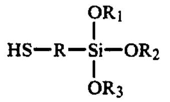

wherein R stands for an alkylene preferably having 1-5 carbon atoms, $R_1$, $R_2$ and $R_3$ each independently stand for a substituted or non-substituted alkyl or acyl, preferably methyl, ethyl, methoxyethyl or acetyl, may be suitably employed. The mercapto group of the above-described compounds may be replaced by a group capable of forming a mercapto group upon reaction with water, such as a thioester group, a disulfide group or episulfide group, if desired.

The mercapto group-containing polymeric substrate may further be obtained by treating systine linkage-containing polymeric materials, such as wool and proteins, with a mercapto carboxylic acid at an elevated temperature.

(2) The thiocarbonyl group-containing polymeric substrate may be obtained by reacting an OH— or $NH_2$-containing polymeric material such as described previously with (i) a thioisocyanate of the formula R—N═C═S (where R is an organic group) to convert the —OH or —$NH_2$ into

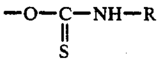
or
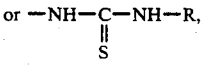
, (ii) with carbon disulfide in the presence of methanol to convert the —OH or —$NH_2$ into

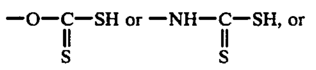

(iii) with a methylol thiourea of the formula

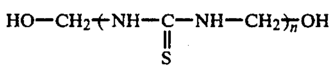

(where n is a positive integer).

(3) The quaternary ammonium salt group

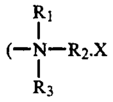

where $R_1$, $R_2$ and $R_3$ each stand for an alkyl, aryl or aralkyl and X stands for an anion such as chlorine ion or sulfate ion) containing polymeric substrate may be obtained by reacting an OH- or $NH_2$-containing polymeric material such as described previously with a compound having both a quaternary ammonium salt group and a group capable of bonding with the OH or $NH_2$ of the polymeric material. Examples of suitable groups to be reacted with the OH or $NH_2$ of the polymeric material include:

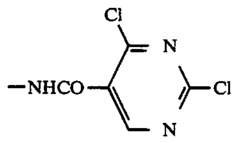

(Dichloropyrimidine-containing residue)

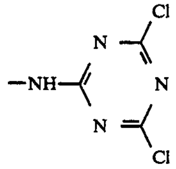

(Dichlorotriazine-containing residue)

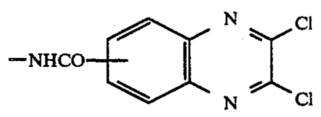

(Dichloroquinoxaline-containing residue)

$—SO_2—CH_2—CH_2OSO_3H$
(Sulfatethylsulfone-containing residue)

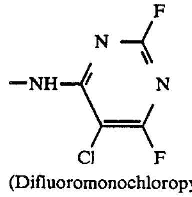

(Difluoromonochloropyrimidine-containing residue)

-continued

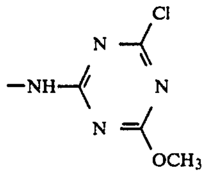

(Monochloromethoxytriazine-containing residue)

$—SO_2NH—CH_2—CH_2—OSO_3H$
(Sulfatethylsulfonamide-containing residue)

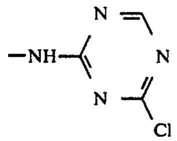

Monochlorotriazine-containing residue)

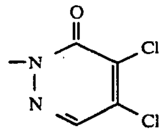

(4,5-Dichloropyridazone-containing residue)

$—NHCO—CH{=}CH_2$
(Acrylamide-containing residue)

$—Si(OR)_3$ (R = alkyl)
(Trialkoxysilane-containing residue)

(4) The amino group-containing polymeric substrate may be amino resins such as urea resins, melamine resins and anilinealdehyde resins; copolymers of vinyl monomers having an amino group; and proteins such as skins, wool and silk. Further, polymeric materials having introduced thereto amino groups may also be used. The introduction of amino radicals into the polymeric materials may be effected by any known method such as by reacting a polymeric material having an active group with a compound having both an amino group and a group capable of reacting and bonding with the active group of the polymeric material. The active group may be, for example, active hydrogen, halogen, hydroxyl or carboxyl, while the group capable of reacting with the active group may be, for example, halogen, hydroxyl, ester, siloxane or carboxyl.

(5) The isocyanato group-containing polymeric substrate may be polymers or copolymers of a monomer having an isocyanato or polymeric materials having introduced isocyanato radicals. The incorporation of isocyanato radicals into the polymeric material may be effected in the same manner as in the amino radicals.

The amount of the mercapto, thiocarbonyl, quaternary ammonium salt, amine or isocyanato group in the polymeric substrate is preferably at least 0.01 weight %, more preferably 0.02 to 1 weight % when calculated as suflur or nitrogen atom.

The above-described polymeric substrate is subjected to a treatment with a source of monovalent copper ions and a sulfur-containing compound at a temperature and for a period of time sufficient to form copper sulfide ($Cu_xS$ where x is a number in the range of 1 to 2) bound on and/or within the polymeric substrate. The treatment with the sulfur-containing compound may be simultaneous with or subsequent to the treatment with the source of monovalent copper ions.

As the source of monovalent copper ions, a combination of a bivalent copper compound, such as a salt or a complex of bivalent copper, and a reducing agent capable of converting the bivalent copper compound into monovalent copper ions is generally employed. Illustrative of suitable bivalent copper salts are cupric sulfate, cupric chloride, cupric nitrate and cupric acetate. Examples of the reducing agent include metallic copper, hydroxylamine or its salt, ferrous sulfate, ammonium vanadate, furfral, sodium hypophosphite and glucose. Cuprous salts or complexes may also be used as the source of monovalent copper ions.

The sulfur-containing compound used in the process of the present invention is of a type which is capable of providing sulfur atoms and/or sulfur ions for reaction with the copper ions to form copper sulfide which is bound on or within the polymeric substrate. Illustrative of suitable sulfur-containing compounds are sodium sulfide, sulfur dioxide, sodium hydrogen sulfite, sodium pyrosulfite, sulfurous acid, sodium sulfite, dithionous acid, sodium dithionite, sodium thiosulfate, thiourea dioxide, hydrogen sulfide, sodium formaldehyde sulphoxylate (Rongalite C), zinc formaldehyde sulphoxylate (Rongalite Z) and mixtures thereof. Most of these sulfur-containing compounds have a reducing activity and, accordingly, they may serve as at least a part of the reducing agent for converting bivalent copper ions into monovalent ones.

When the treatments with the source of monovalent copper ions and with the sulfur-containing compound are to be simultaneous, the polymeric substrate is immersed in a bath containing the source of monovalent copper ions and the sulfur-containing compound preferably at a temperature of 20° to 150° C., more preferably 30° to 100° C., generally for a period of time of 1 to 24 hours. When the reaction is conducted at an elevated temperature, it is preferred that the bath be heated at a rate of 1° to 3° C./min. The pH of the bath is preferably maintained within the range of about 1.5 to 6, more preferably 3 to 5. For this purpose, a pH controlling agent may be used. Examples of the pH controlling agents include inorganic acid such as sulfuric acid, hydrochloric acid and phosphoric acid, organic acids such as citric acid and acetic acid; and mixures thereof. It is possible to carry out the treatment at a low temperature when the pH is low.

In the embodiment of the present invention wherein the treatment with the sulfur-containing compound is preceded by the treatment with the source of monovalent copper ions, the polymeric substrate is first immersed in first bath containing the source of monovalent copper ions preferably at a temperature of 50° to 150° C., more preferably 80° to 110° C. for a period of time so that monovalent copper ions are adsorbed by the polymeric substrate (first stage). The first stage reaction time is generally 0.5 to 2 hours. The pH of the first bath is preferably maintained within the range of 1 to 3 with the use of a pH controlling agent such as described above. The polymeric substrate from the first stage having the adsorbed monovalent copper ions is then treated in a second bath containing the sulfur-containing compound (second stage). Preferably, the treated substrate from the first stage is washed with a suitable liquid such as water prior to the second treatment stage. The treatment in the second stage is preferably carried out at a temperature of 50° to 120° C., more preferably 70°-100° C. The second stage reaction time generally ranges from 0.5 to 4.5 hours. It is preferable to gradually heat the bath at a rate of 1° to 3° C./min. In case where the second stage treatment employs a gaseous sulfur-containing compound, the treated material from the first stage is contacted therewith at a pressure of 0.5 to 3 atom, at a temperature of 90° to 120° C. for 1 to 3 hours.

In both the above single and two-stage treatments, the amount of the source of monovalent copper ions varies according to the intended degree of electrical conductivity, the content of the mercapto, thiocarbonyl, quaternary ammonium salt, amino or isocyanato group in the polymeric substrate, the form of the polymeric substrate and the like. Generally, the source of monovalent copper ions is used in an amount of 2 to 15 g in terms of metallic copper per 100 g of the polymeric substrate. The concentration of the source of monovalent copper ions in the bath is generally 2 to 60 g/liter, preferably 5 to 30 g/liter, in terms of elemental copper. The amount of sulfur-containing compound is generally 3 to 5 mol per mole of the monovalent copper ions. The concentration of the sulfur-containing compound in the bath is generally 2 to 50 g/liter, preferably 4 to 25 g/liter.

The amount of copper sulfide to be bound to the polymeric substrate is variable according to the object of the end use of the electrically conducting material. The amount of copper sulfide is generally 0.5 to 30 %, preferably 1 to 15 %, in terms of elemental copper, based on the weight of the polymeric substrate.

The electrically conducting material of the present invention is excellent in both electrical conductivity and fastness, i.e. it exhibits outstanding resistance to water, heat and physical abrasion. Therefore, the rate of the decrease in electrical conductivity during use is very low. In order to further improve the electrical conductivity and fastness, it is advisable to incorporate sulfide of an auxiliary metal selected from silver, gold and elements of the platinum group into the copper sulfide-carrying polymeric substrate. Incorporation of the auxiliary metal sulfide may be effected by treating the copper sulfide-containing polymeric substrate in a bath containing a source of ions containing the auxiliary metal. The concentration of the auxiliary metal-containing ions in the bath is generally in the range of 0.005 to 10 g/liter, preferably 0.01 to 6 g/liter in terms of the elemental metal. The treatment is performed at a temperature from room temperature to 110° C., preferably 30° to 80° C., for a period of 0.5 to 20 hours, preferably 1 to 10 hours, with the ratio by weight of the bath to the material to be treated being in the range of 5:1 to 50:1, preferably 10:1 to 30:1.

It is preferred that the treatment with the auxiliary metal-containing ions be performed in the presence of a sulfur-containing compound of the type previously described or be followed by the treatment with the sulfur-containing compound to further improve both the stability and the electrical conductivity of the resulting electrically conducting material. The sulfur-containing compound is generally used in an amount of 0.2 to 5 mols, preferably 0.4 to 3 mols, per mol of the source of auxiliary metal-containing ions.

The incorporation of the auxiliary metal sulfide may also be effected by performing the above-described treatment of the polymeric substrate with the source of monovalent copper ions and/or with the sulfur-containing compound in the presence of a source of auxiliary metal-containing ions of the type previously described.

The amount of the sulfide of the auxiliary metal in the electrically conducting material of the present invention is, in general, such that the atomic ratio M/Cu, where M stands for the auxiliary metal, is 0.0001 to 0.5, preferably 0.001 to 0.3, more preferably 0.01 to 0.2. Too small an amount of the auxiliary metal component is insufficient to attain an improvement in washability, whereas an amount of the auxiliary metal component in excess of an M/Cu atomic ratio 0.5 tends to lower the electrical conductivity and is also disadvantageous from an economic point of view since the auxiliary metal is very expensive.

The electrically conducting material of this invention, when in the form of fibers, may be advantageously utilized as in clothing, carpets, interior decorative sheets, gloves or the like by themselves or in combination with other fibers because of their static charging resistance and affinity for dyes. When in the form of a film or plate, the electrical conductivity and transparency of the materials of this invention allow use as covers and enclosures for electric parts such as integrated circuits and large-scale intergrated circuits. The electrically conductive material of this invention may be incorporated as a powder into a coating composition to form electrically conductive coatings. Because of the excellent thermal stability of the sulfides, the powder or cut fibers of the electrically conductive material of this invention can be incorporated in a melt for the production of molded articles used as electromagnetic shields. Thus, the electrically conducting meterials of this invention lend themselves to numerous applications in many fields.

The following examples further illustrate the present invention. In the examples, the washability was determined according to the method specified in Japanese Industrial Standard (JIS) L 1045. That is, a sample was washed with a liquid containing 3 g/liter of a commercially available detergent ("ALL TEMPERATURE CHEER" of Proctor & Gamble Inc.) with a ratio by weight of the sample to the washing liquid of 1:50. In the washability tests, a dye-fastness testing device was employed together with ten stailess balls, with agitation at 50° C. for 30 min followed by washing with water and drying. Such a procedure was repeated a number of times for examination of fastness to washing. In the following examples, "part" is "by weight".

EXAMPLE 1

Cotton fiber (10 g) was immersed in a liquid mixture containing 70 g of thioglycolic acid, 37.5 g of acetic anhydride, 17.5 g of glacial acetic acid and 0.25 g of sulfuric acid at 40° C. for 6 days to obtain mercapto group-containing cotton fiber. The fiber (1 part) was then immersed in an aqueous bath (20 parts) containing 0.35 parts of cupric sulfate and 0.15 parts of hydroxylamine sulfate at 100° C. for 90 min. After being washed with water, the cuprous ion-carrying fiber (1 part) was treated in an aqueous bath (20 parts) containing 0.1 part of sodium dithionite, 0.05 parts of sodium acetate and 0.05 parts of acetic acid at 95° C. for 60 min. Subsequently, the fiber was washed with water and dried to obtain a dark gray fiber having a specific resistance of $4.5\times10^{-2}$ ohm·cm. The electrically conducting fiber withstood 20 washes.

EXAMPLE 2

The mercapto group-containing cotton fiber (1 part) obtained in Example 1 was immersed in an aqueous bath (20 parts) containing 0.3 parts of cupric sulfate, 0.2 parts of sodium thiosulfate, 0.1 part of sodium hydrogen sulfite, 0.05 parts of acetic acid, 0.05 parts of sodium acetate at 60° C. for 3 hours. The resulting fiber was washed with water and dried to obtain a dark gray fiber having a specific resistance of $5.0\times10^{-2}$ ohm·cm. The electrically conducting fiber withstood 20 washes.

EXAMPLE 3

The electrically conducting fiber (5 g) obtained in Example 1 was immersed in 100 ml of an aqueous bath containing 2 g/liter of silver nitrate at 50° C. for about 2 hours and then washed with water and dried. The thus obtained fiber withstood 50 washes.

EXAMPLE 4

A polyester staple fiber (3 denier, 76 cut length) was treated for the introduction of mercapto radicals thereinto in the same manner as described in Example 1 except that the reaction temperature of 65° C. was used. The resulting mercapto group-containing polyester fiber was then treated for the incorporation of copper sulfide in the same manner as described in Example 2, thereby to obtain a dark gray fiber having a specific resistance of $8\times10^{-2}$ ohm·cm.

EXAMPLE 5

The mercapto group-containing cotton fiber (1 part) obtained in Example 1 was immersed in an aqueous bath (20 parts) containing 0.3 parts of cupric sulfate, 0.2 parts of sodium thiosulfate, 0.1 part of sodium hydrogen sulfite, 0.005 parts of palladium chloride, 0.05 parts of acetic acid and 0.05 parts of sodium acetate at 60° C. for 3 hours. The resulting fiber was washed with water and dried to obtain a dark gray fiber having a specific resistance of $5.3\times10^{-2}$ ohm·cm. The electrically conducting fiber withstood 50 washes.

EXAMPLE 6

Thiourea was reacted with formaldehyde to obtain methylol thiourea having the following formula:

$$HO-CH_2\,(NH-\underset{\underset{S}{\|}}{C}-NH-CH_2)_n\,OH$$

(n is 2 and 3)

The reaction mixture was diluted with water and mixed with a quantity of ammonium chloride to obtain 20 % methylol thiourea solution. A cotton fiber (1 part) was then immersed in the thiourea solution (50 parts) at room temperature for 60 min. The thus treated fiber was squeezed, dried at 60° C. and heated at 150° C. for 15 min. The resulting fiber containing introduced thiocarbonyl groups was treated for the incorporation of copper sulfide in the same manner as described in Example 2 to obtain an electrically conducting fiber having a specific resistance of $4.6\times10^{-2}$ ohm·cm.

EXAMPLE 7

A cotton fabric was immersed in an aqueous solution containing 10 wt % of a silane coupling agent of the formula:

$$(CH_3O)_3Si-C_3H_6-\underset{\displaystyle C_{18}H_{37}}{\underset{|}{\overset{+}{N}}}(CH_3)_2.Cl^-$$

at 40° C. for 30 min. The resultant fabric (1 part) containing quaternary ammonium salt groups was then immersed in an aqueous bath (20 parts) containing 0.3 parts of cupric sulfate, 0.05 parts of acetic acid, 0.05 parts of sodium acetate, 0.2 parts of sodium thiosulfate, 0.1 part of sodium Sulfite and 0.03 parts of silver sulfate at 60° C. for 5 hours. The thus obtained fabric was washed with water and dried to obtain an electrically conducting fabric having a specific resistance of $4.5\times10^{-2}$ ohm·cm.

EXAMPLE 8

The quaternary ammonium salt group-containing fabric (1 part) obtained in Example 7 was immersed in an aqueous bath (20 parts) containing 0.3 part of cupric sulfate and 0.1 part of hydroxylamine sulfate at 100° C. for 60 min. After being washed with water, the cuprous ion-carrying fabric (1 part) was immersed in an aqueous bath (20 parts) containing 0.1 part of sodium dithionite, 0.05 parts of acetic acid and 0.05 parts of sodium acetate at 95° C. for 2 hours. The thus treated fabric was then washed with water and dried to obtain an electrically conducting fabric having a specific resistance of $5.2\times10^{-2}$ ohm·cm.

EXAMPLE 9

Polyamide threads (100 denier, 24 cut length) were immersed in an aqueous solution containing 0.2 wt % of 3-mercaptopropyltrimethoxysilane of the formula:

$$HS\!\left(CH_2\right)_3Si(OCH_3)_3$$

at 50° C. for 30 min. The thus obtained mercapto group-containing threads (1 part) were immersed in an aqueous bath (20 parts) containing 0.3 parts of cupric sulfate, 0.05 parts of acetic acid, 0.05 parts of sodium acetate, 0.2 parts of sodium thiosulfate, 0.1 part of sodium sulfite and 0.02 parts of silver nitrate at 50° C. for 6 hours. The resulting threads were washed with water and dried to obtain electrically conducting threads having a specific resistance of $4.3\times10^{-2}$ ohm·cm.

EXAMPLE 10

A polyester film with a thickness of 40 μm was immersed in an aqueous solution containing 0.05% of 3-mercaptopropyltrimethoxysilane at 50° C. for 30 min. The resulting film (1 part) was immersed in an aqueous bath (100 parts) containing 0.05 parts of cupric sulfate, 0.02 parts of acetic acid, 0.02 parts of sodium acetate, 0.05 parts of sodium thiosulfate, 0.02 parts of sodium sulfite and 0.0003 parts of silver nitrate at 40° C. for 6 hours. The film was washed with water and dried to obtain an electrically conducting film having a surface resistivity of 200 ohms.

EXAMPLE 11

A Nylon filament (10 g, 30 denier) was immersed at room temperature for 30 min in an aqueous solution obtained by dissolving 0.5 g of 3-aminopropyltriethoxysilane in 100 ml water to obtain an amino group-containing Nylon filament. The filament (10 g) was then immersed at 60° C. for 4 hours in an aqueous bath obtained by dissolving 0.15 g of cupric sulfate, 0.1 g of sodium thiosulfate, 0.05 g of sodium hydrogen sulfite, 0.03 g of acetic acid and 0.03 g of sodium acetate in 200 ml water. The resulting filament was washed with water and dried to obtain an electrically conducting filament having a specific resistance of $2.6\times10^{-1}$ ohm·cm.

EXAMPLE 12

A polyester staple (10 g) was immersed at 80° C. for 30 min in an aqueous solution obtained by dissolving 0.5 g of 3-(β-aminoethyl)aminopropyltrimethoxysilane of the formula:

$$H_2NCH_2CH_2NHCH_2CH_2CH_2Si(OCH_3)_3$$

in 100 ml water to obtain an amino group-containing polyester staple. The staple thus obtained was then treated for the incorporation of copper sulfide in the same manner as described in Example 1 to obtain a gray staple having a specific resistance of 3 ohm·cm.

EXAMPLE 13

Cotton threads (10 g) were immersed in a solution obtained by dissolving 0.5 g of 3-isocyanatopropyltriethoxysilane in 100 ml methanol. The threads were squeezed and air-dried to obtain isocyanto group-containing cotton threads. The threads thus obtained were then treated for the incorporation of copper sulfide in the same manner as described in Example 1 to obtain olive-gray threads having a specific resistivity of $6.2\times10^{-1}$ ohm·cm.

We claim:

1. An electrically conducting material comprising a water-insoluble, solid polymeric substrate containing at least 0.01 weight %, when calculated as sulfur or nitrogen atom, of a group selected from mercapto, thiocarbonyl, quaternary ammonium salt, amino and isocyanato, and copper sulfide bound to said polymeric substrate.

2. An electrically conducting material as claimed in claim 1, wherein the amount of the copper sulfide as about 0.5 to 30% in terms of elemental copper based on the weight of said polymeric substrate.

3. An electrically conducting material as claimed in claim 1, wherein said polymeric substrate is a member selected from polyesters, polyamides, polychlals, proteins, cotton, polyvinyl chloride resins, celluloses, polyvinyl alcohol resins and amino resins and modified by introduction of mercapto, thiocarbonyl, quaternary ammonium salt or isocyanato radicals.

4. An electrically conducting material as claimed in claim 1, wherein said polymeric substrate is a polyamide having introduced mercapto radicals.

5. An electrically conducting material as claimed in claim 1, further comprising sulfide of an auxiliary metal bound to said substrate and selected from silver, gold and elements of the platinum group.

6. An electrically conducting material as claimed in claim 5, wherein the amount of the sulfide of the auxiliary metal is such that the atomic ratio M/Cu, where M stands for the auxiliary metal, is in the range of about 0.0001 to 0.5.

7. A process for the preparation of an electrically conducting material, comprising treating a water-insoluble, solid polymeric substrate containing at least 0.01 weight %, when calculated as sulfur or nitrogen atom, of a group selected from mercapto, thiocarbonyl, quaternary ammonium salt, amino and isocyanato with a source of monovalent copper ions and a sulfur-containing compound to form copper sulfide bound to said polymeric substrate.

8. A process as claimed in claim 7, wherein the treatment with the sulfur-containing compound is separate from and subsequent to the treatment with the source of monovalent copper ions.

9. A process as claimed in claim 7, wherein the treatment with the source of monovalent copper ions and with the sulfur-containing compound is within the same treating bath.

10. A process as claimed in claim 7, wherein said source of monovalent copper ions includes a copper compound and a reducing agent capable of reducing bivalent copper ions into monovalent copper ions.

11. A process as claimed in claim 10, wherein said reducing agent is selected from the group consisting of metallic copper, hydroxylamine, a salt of hydroxylamine, ferrous sulfate, ammonium vanadate, furfural, sodium hypophosphite, glucose and mixtures thereof.

12. A process as claimed in claim 7, wherein said sulfur-containing compound is selected from the group consisting of sodium sulfide, sulfur dioxide, sodium hydrogen sulfite, sodium sulfite, sodium pyrosulfite, sulfurous acid, dithionous acid, sodium dithionite, sodium thiosulfate, thiourea dioxide, hydrogen sulfide, sodium formaldehyde sulphoxylate, zinc formaldehyde sulphoxylate and mixtures thereof.

13. A process as claimed in claim 7, wherein said polymeric substrate is a member selected from polyesters, polyamides, polychlals, proteins, cotton, polyvinyl chloride resins, celluloses, polyvinyl alcohol resins and amino resins and modified by introduction of mercapto, thiocarbonyl, quaternary ammonium salt or isocyanato radicals.

14. A process as claimed in claim 13, wherein said polymeric substrate is that obtained by reacting a polyamide with a mercapto group-containing silane coupling agent to introduce mercapto groups into the polyamide.

15. A process as claimed in claim 7, further comprising treating said polymeric substrate with a source of ions containing an auxiliary metal selected from the group consisting of silver, gold and elements of the platinum group to form sulfide of said auxiliary metal bound to said polymeric substrate.

* * * * *